United States Patent [19]

Hedin et al.

[11] Patent Number: 5,386,556
[45] Date of Patent: Jan. 31, 1995

[54] NATURAL LANGUAGE ANALYZING APPARATUS AND METHOD

[75] Inventors: Erik B. Hedin; Gregor I. Jonsson, both of Lidingo; Lars E. Olsson, Kista; Mohammad A. Sanamrad, Lidingo; Sven O. G. Westling, Stockholm, all of Sweden

[73] Assignee: International Business Machines Corporation, Armonk, N.Y.

[21] Appl. No.: 996,353

[22] Filed: Dec. 23, 1992

Related U.S. Application Data

[63] Continuation of Ser. No. 485,917, Feb. 27, 1990, abandoned.

[30] Foreign Application Priority Data

Mar. 6, 1989 [SE]  Sweden ................................ 8900774

[51] Int. Cl.6 ............................................. G06F 15/40
[52] U.S. Cl. ...................... 395/600; 395/12; 395/934; 364/419.08; 364/274.8; 364/285.4; 364/DIG. 1
[58] Field of Search .......... 364/419, DIG. 1, DIG. 2; 395/600, 12, 500, 575, 934

[56] References Cited

U.S. PATENT DOCUMENTS

| | | | |
|---|---|---|---|
| 4,688,195 | 8/1987 | Thompson et al. | 364/300 |
| 4,706,212 | 11/1987 | Toma | 434/157 |
| 4,821,230 | 4/1989 | Kumano et al. | 364/900 |
| 4,914,590 | 4/1990 | Loatman et al. | 364/419 |
| 4,931,935 | 6/1990 | Ohira et al. | 364/419 |
| 5,091,876 | 2/1992 | Kumano et al. | 364/419 |
| 5,197,005 | 3/1993 | Shwartz et al. | 364/419 |
| 5,237,502 | 8/1993 | White et al. | 364/419.01 |

FOREIGN PATENT DOCUMENTS

| | | |
|---|---|---|
| 0091317 | 10/1983 | European Pat. Off. . |
| 0168814 | 1/1986 | European Pat. Off. . |
| 2096374 | 10/1982 | United Kingdom . |

Primary Examiner—Thomas G. Black
Assistant Examiner—Maria N. Von Buhr
Attorney, Agent, or Firm—Marc D. Schechter; Robert P. Tassinari, Jr.

[57] ABSTRACT

A natural language (NL) analyzing system is provided with the capability to analyze NL expressions and to resolve ambiguities and present them to the user for verification of correct interpretation. A conceptual model of the system, relevant to the application in which the invention is implemented, is created (customizing the system) by the user, and is stored as a conceptual schema. The schema is built of logical facts representing entities (concepts) and relationships between entities, forming a description of the universe of discourse or object system in question. The entities of the schema have at least one external connection, namely to natural language terms in a vocabulary. The schema itself is completely language independent, though the components of it may have "names" expressed in a natural language such as English. There may be a second connection to the entities, namely where the system is used in a query system for relational data bases. In this case the entities of the schema represent objects in the data base, and thus there is a connection between the entities and those objects of the data base. The actual analysis of NL expressions is performed by a natural language engine (NLE) in cooperation with an analysis grammar and the schema. The analysis results in an intermediate, language-independent logic form representation of the input, which is paraphrased back to NL for verification. If the input is a query, there is a translation into a query language such as SQL.

11 Claims, 5 Drawing Sheets

QUESTION: 'WHO EXPORTS ALL PRODUCTS ?'

TERMS NEEDED IN MODEL: EXPORT (t1)

ENTITIES AND RELATIONSHIPS: EXPORT (ENTITY;e1.)

HAS_SUBJECT — PRODUCER (e3)
HAS_OBJECT — PRODUCT (e8)
IS_SUBTYPE_OF — COUNTRY (e2)

TABLE.CO

| CNTRY | CPTL | CNT_ID |
|---|---|---|
| FRANCE | PARIS | 5 |
| JAPAN | TOKYO | 3 |
| BRAZIL | BRASILIA | 2 |
| SWEDEN | STOCKHOLM | 5 |

TABLE.EXPORT

| PRDCR | PRDCT |
|---|---|
| JAPAN | CAR |
| JAPAN | TEXTILE |
| SWEDEN | STEEL |
| SWEDEN | TEXTILE |
| FRANCE | WINE |
| FRANCE | CAR |
| FRANCE | STEEL |
| FRANCE | TEXTILE |

TABLE.CNT

| CNTNNT | ID |
|---|---|
| AFRICA | 1 |
| AMERICA | 2 |
| ASIA | 3 |
| AUSTRALIA | 4 |
| EUROPE | 5 |

NATURAL LANGUAGE ANALYZING APPARATUS AND METHOD

This is a continuation of application Ser. No. 07/485,917, filed Feb. 27, 1990, now abandoned.

BACKGROUND OF THE INVENTION

The present invention relates in general to the use of natural language for communication with computers, and in particular to querying data bases, e.g. relational data bases, or to translation between two natural languages of application specific texts.

There is a widely recognized demand in the computer world for user friendly interfaces for computers. Numerous attempts have been made in order to achieve this with various results.

The simplest way of creating programs that are possible to use without having particular skills is to design menu based systems where the user selects functions from a panel with several options.

Another way is to make use of screens with symbols ("icons") and letting the user select from the screen by pointing at the selected symbol with a light-pen, or by moving a cursor by means of a so called "mouse", pointing at the desired symbol, and then pressing a button for activating the function.

These methods have severe limitations in many applications where great flexibility in selection is desired, since such systems must be predefined, and unexpected or new desires require programming of the system again.

The need for flexibility is especially important for data retrieval from data bases. In order to make searches in data bases, often complex query languages must be used, requiring high skill. If reports are to be created from the retrieved data, further processing must be carried out. In addition, several successive queries may have to be entered before the end result is arrived at.

An example of a query language is SQL (Structured Query Language; IBM program no. 5748-XXJ). This is widely used but due to its complexity it is not possible for the average user to learn it satisfactorily, instead there are specialists available for creating SQL query strings that can be implemented as commands for searches of a routine nature. The specialist must be consulted every time a new kind of query is to be made.

There have been numerous attempts to remedy such deficiencies by trying to create interfaces to data bases which can interpret a query formulated in natural language. However, practically every such attempt has been based on key word identification in the input query strings. This inevitably leads to ambiguities in the interpretation in many cases.

Rather recently, research in the artificial intelligence area has led to systems where lexical, syntactical, and semantic analysis has been performed on input strings, utilizing grammars and dictionaries, mainly for pure translation purposes. It seems as if these systems are successful only to a certain extent, in that there is a relatively high rate of misinterpretations, resulting in incorrect translations. This frequently leads to the requirement of editing the result.

United Kingdom Patent Application 2,096,374 (Marconi Company) discloses a translating device for the automatic translation of one language into another. It comprises word and syntax analysis means, and the translation is performed in two steps by first translating the input sentence into an intermediate language, preferably artificial, and then translating the intermediate language into the target language.

European Patent Application EP-0168814 (NEC Corporation) discloses a language processing dictionary for bidirectionally retrieving morphemic and semantic expressions. It comprises a retrieving arrangement which is operable like a digital computer, and the dictionary itself is comprised of elementary dictionaries, namely a morphemic, a semantic and a conceptual dictionary. Each morphemic and conceptual item in the corresponding dictionaries are associated with pointers to a set of syntactical dictionary items. The syntactical items are associated with two pointers to a set of morphemic and a set of conceptual items.

U.S. Pat. No. 4,688,195 (Thompson et al, assigned to Texas Instruments) discloses a natural language interface generating system. It generates a natural language menu interface which provides a menu selection technique particularly suitable for the unskilled user.

However, none of the above listed patents fully address the problem solved by the present invention, although they do present alternative technical solutions to certain features.

SUMMARY OF THE INVENTION

It is an object of the present invention to provide a device and a method by means of which a user can formulate input expressions in a selected natural language in reasonably random fashion, which expressions are interpreted lexically, syntactically, and semantically by means of dictionaries and analysis grammars, and which are disambiguated and transformed into an intermediate representation form.

This intermediate representation form can then be used for creating queries in a specific query language (such as SQL for a relational data base) and/or for paraphrasing or "play-back" of the input for verification of the correctness of the machine's interpretation of the input expression or query. For this purpose there is provided a natural language generator including a generation grammar.

If the generation grammar is for another natural language than that of the analysis grammar, the latter function can also be used for pure translation into another language.

According to the invention, a natural language analyzing apparatus, has means for inputting sentences or expressions in natural language. Analysis grammar means analyzes the natural language in question. A vocabulary module contains definitions of terms of the natural language in question. Parsing means identifies the input sentence or expression as being grammatical and generates one or more parses, if there is one or more possible interpretations of the expression, in cooperation with the analysis grammar means and the vocabulary module.

The invention also has a conceptual schema stored in the system. The conceptual schema contains entities (e1, ... en) and relationships between the entities so as to form a description of a relevant universe of discourse. The entities and relationships of the universe of discourse are linked to corresponding natural language terms (t1) in the vocabulary.

Generator means comprise callable semantic routines for generating an intermediate representation of the natural language input. As a result, the semantic routines access the conceptual schema for checking that the input expression is valid in the relevant universe of discourse.

An important feature of the invention is the conceptual schema connected to natural language terms in a vocabulary. The schema is completely language independent, and contains only concepts (entities) and relations between concepts.

By using such a schema, which is a model of a relevant so called 'Universe of Discourse' (or object system, which is a collection of abstract or concrete things and information about these things, to which the natural language expression to be analyzed, is relevant), it is possible to obtain complete resolution of ambiguities, as long as the input expression is in reasonable agreement with the Universe of Discourse. This has not been possible previously.

Since the schema is language independent there is a great advantage in that it is very easy to change analysis grammar and vocabulary, and thus to switch between different natural languages. In fact grammars and dictionaries can be supplied as 'plug-in' modules.

In a preferred embodiment of the invention the schema is also connected to the contents of a relational data base. That is, each concept of the schema may or may not have a unique connection to a table containing objects relating to that concept.

Thus, the schema constitutes a link between natural language and the data base. If thus the input expression is a query to the data base, the analysis will produce an interpretation of the query which then is translated into the query language for that data base (e.g. SQL).

In another embodiment, queries are paraphrased, i.e. if a query is ambiguous, two or more paraphrases are presented to the user, for him to select the correct one. Thereby one achieves that a 100% correct query is made to the data base.

In a further embodiment the paraphrasing function is used for pure translation. Thereby a generation grammar and a vocabulary for a second language is used when paraphrasing the input expression. In this case there is no use of a data base in the sense of the previously mentioned embodiment.

DESCRIPTION OF THE PREFERRED EMBODIMENTS

Figure 1:
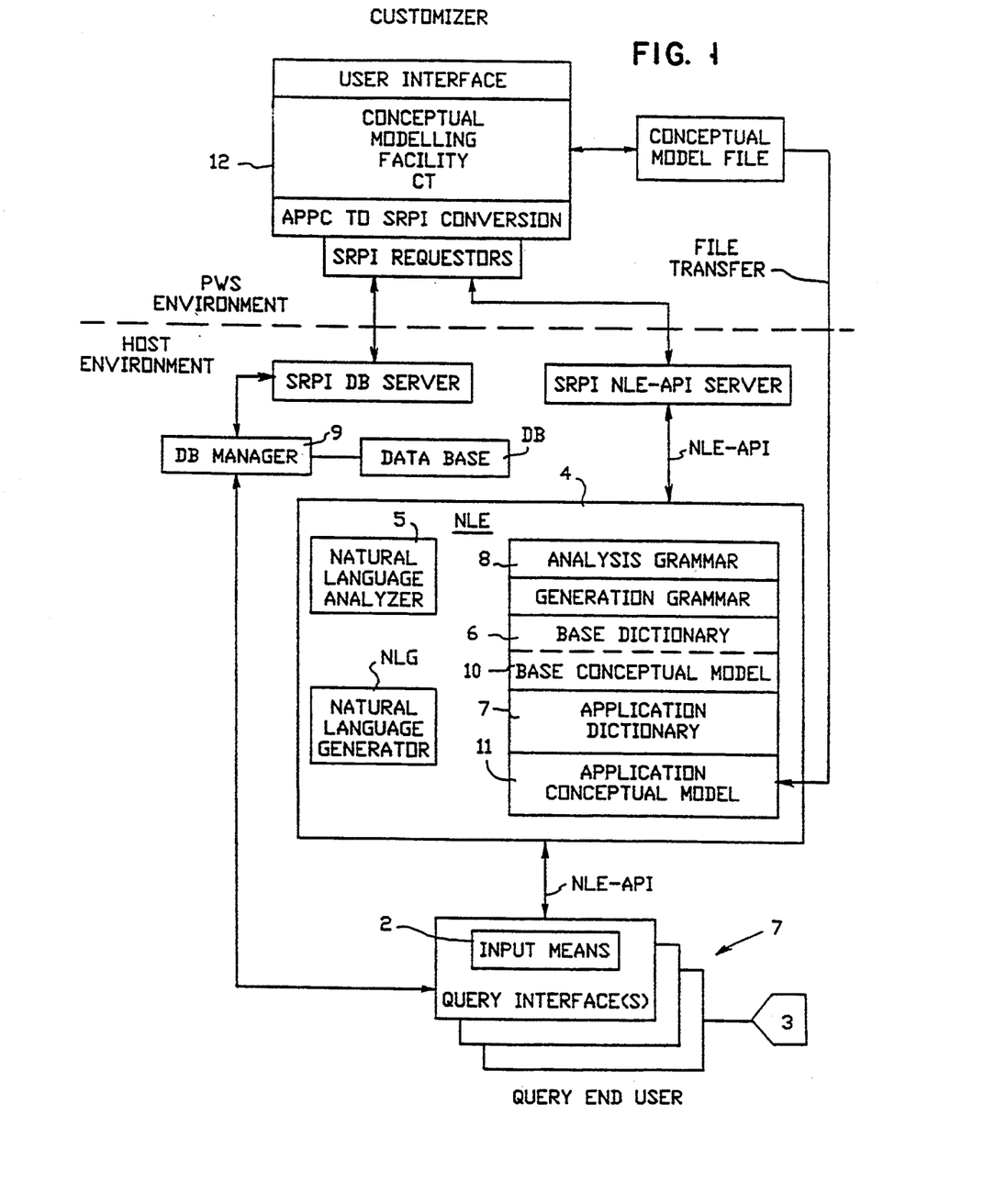
FIG. 1 is a conceptual overview of a system comprising the natural language analyzing device according to the present invention, as implemented for querying a relational data base.

With reference now to FIG. 1, the general layout and design of a system for querying a data base comprising the invention will be given.

A data base query system incorporating the invention thus has a query interface 1 comprising input means 2 that can have any suitable form for transforming character strings into digital signals, e.g. a keyboard of standard type. It is also conceivable that the input query is made by speech, in which case the input means would comprise a microphone and sound analyzing means.

There may also be present a display means 3 for presenting results of queries, results of parsing (paraphrased queries, to be described later), and also for displaying, e.g. help panels.

The core of the system is the natural language engine NLE 4. It comprises a natural language analyzer 5 which includes a parser and which is used for the actual syntax analysis. The analyzer 5 makes use of base dictionary 6 and application dictionary 7 and an analysis grammar 8 to perform the actual parsing of the input (to be described in more detail later).

The system further comprises a data base (DB) and a data base manager 9. It will not be described in detail since one skilled in the art readily recognizes the necessary design of such a device.

An essential feature of the invention is a model of the data base in the form of a conceptual schema (base conceptual model 10 and application conceptual Model 11), which may be created by the user.

The concept of a conceptual schema is described in the literature in the field of artificial intelligence, (see e.g. "Konceptuell Modellering" by J. Bubenko et al).

Briefly, a conceptual model consists of

1) 'Entities', which are any concrete or abstract thing/things of interest;
2) 'Relationships' which are associations between entities;
3) 'Terms' which are natural language expressions that refers to entities;
4) 'Database Representations' which are mappings of entities into the database; and
5) 'Database Information' comprising 'Referential Integrity' and 'Key'.

As many entities as the user finds necessary may be defined, and the system will automatically suggest that every table in the data base is associated with an entity.

Entities of the model may be connected or linked to each other by one or several relationships. In general relationships fall into the following categories:

---

'is an instance of'
'identifies'
'is named'
'is a subtype of'
'is counted by'
'is measured by'
'possesses'
'subject'
'direct object'
'dative object'
'preposition'
'adverbial of place'
'adverbial of time'
.
.
.
(etc)

---

The 'subtype' relationship is a hierarchical relationship and is treated separately from the other non-hierarchical relationships. Most of the above relationships are self-evident as to their meaning, but for clarity a few examples will be given with reference to FIGS. 2A and 2B.

Figure 2A:
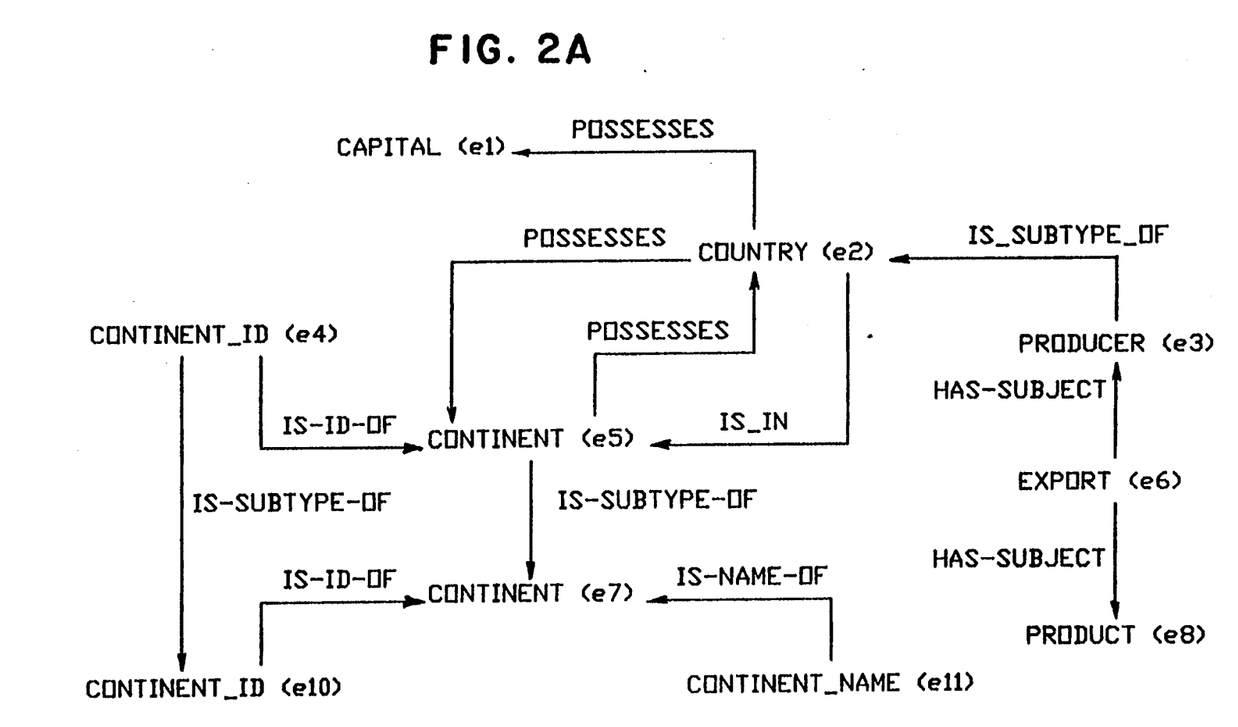
FIG. 2A is a schematic illustration of a simple example of a conceptual schema, modelling the data base contents, and which can be used with the invention.
Figure 2B:
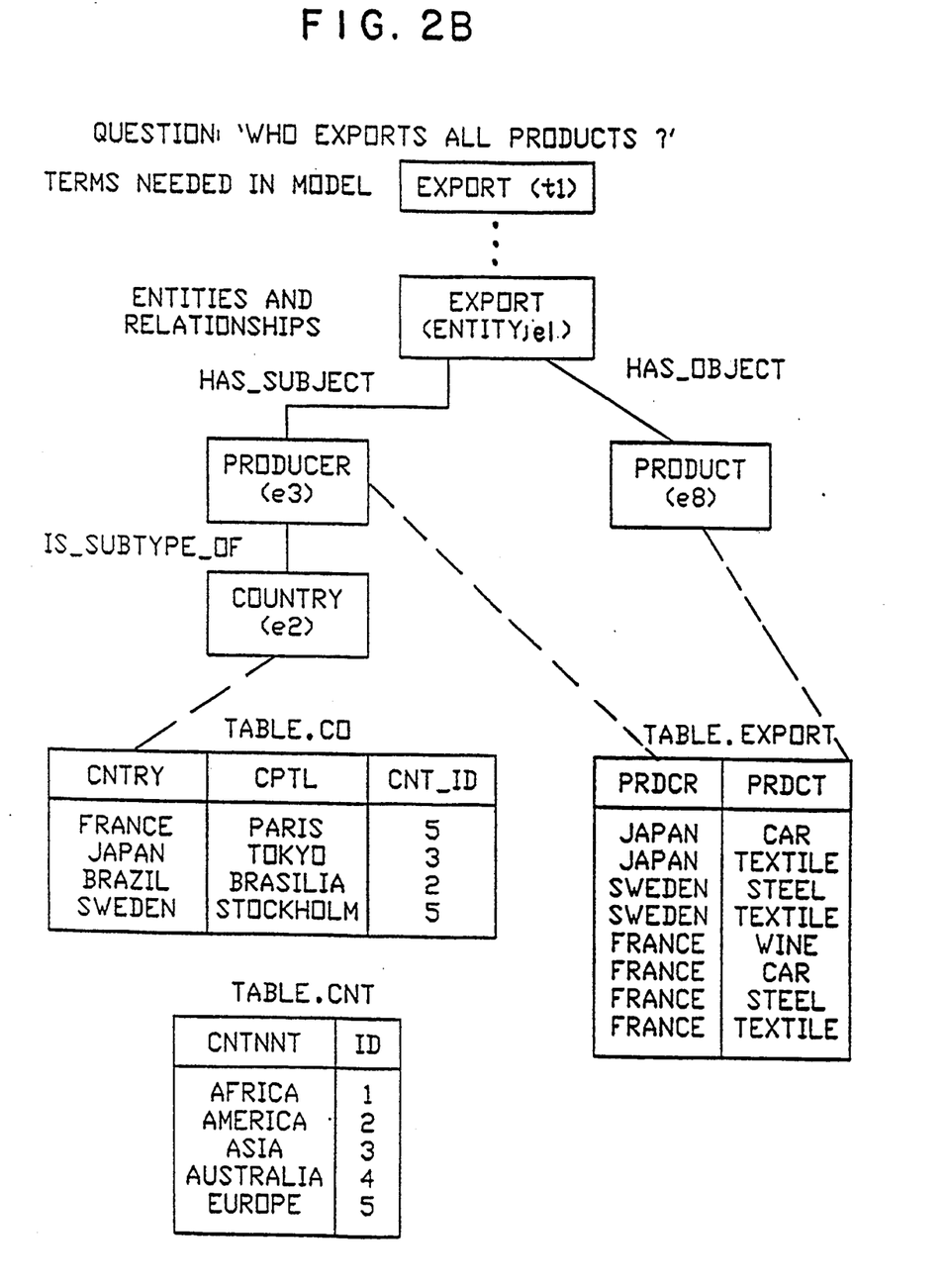
FIG. 2B is a simplified illustration of how parts of the schema of FIG. 2A is linked to tables in a data base and to natural language terms in a vocabulary.

| Entity | Relationship | Entity |
|---|---|---|
| continent (CNTNNT) | 'is identified by' | continent id (ID) |
| country (CNTRY) | 'possesses' | capital (CPTL) |
| producer (PRDCR) | 'is subtype of' | country (CNTRY) |
| export (EXPORT) | 'has object' | product (PRDCT) |

(in this last example the entity EXPORT has no link to a table in the data base).

Entities of the model are connected to natural language terms by the user, apart from a base collection of terms common to all applications (e.g. list, show, who, what, which, is, more etc.). Such terms are members of a base dictionary which is part of the system initially. It should be noted that an entity may be associated with zero, one or more natural language terms of the same category. The same term can also be associated with more than one entity.

Returning to FIG. 1, the actual building of the schema, comprising connecting it to the natural language terms and to tables of the data base, is performed with a customization tool (CT) 12 (described later). The "SRPI" boxes denote what one might call a communication protocol, necessary for communication with the host, for accessing the data base during customization (SRPI = server requester programming interface).

The way in which the conceptual schema is used to form a natural language interface to a data base or for translation purposes by connecting it to natural language terms has not been previously disclosed.

With reference now to FIGS. 2A and 2B, an example of how the conceptual schema is implemented within the scope of the invention will be given. In the example, a relational data base with tables containing information about a number of countries, is assumed as the information containing system.

As can be seen in FIG. 2B, the first table TABLE.CO contains three columns the contents of which relate to countries. One column lists countries, a second lists the capitals of the countries, and the third lists the continent to which the countries belong in terms of a continent identity number.

The second table TABLE.EXPORT lists in the first column the names of producer countries that export various products, and the second column lists which products each country in fact exports.

Finally the third table TABLE.CNT lists relevant continents in one column and a continent identity number in a second column.

The conceptual schema (FIG. 2A) is created during customization (to be described) and it represents a model which describes the collection of all objects in the information system, all facts about the system which are of interest to the users, and the relations between the objects and facts. In other words, it is a model of the universe of discourse (or object system) which is a selected portion of the real world, or a postulated world dealt with in the system in question.

The conceptual schema comprises entities (concepts), in the examples denoted as en, where n is an integer, and relationships (links) between these entities (concepts). The schema has two types of external connections, one to the natural language terms (as expressed by natural language vocabulary), and one to the data base (see EXAMPLES II and IV, below).

It is very important to recognize that the schema itself is language-independent, even though of course the concepts may have been assigned "names" expressed in a natural language, e.g. English.

The model as shown in FIG. 2A, is stored as a set of logical facts:

EXAMPLE I

| | |
|---|---|
| possesses(e2, e1). | |
| possesses(e2, e5). | |
| possesses(e5, e2). | |
| nom(e6, e3). | (e6 has-subject e8) |
| acc(e6, e8). | (e6 has-object e8) |
| subtype(e3, e2). | |
| subtype(e4, e10). | |
| subtype(e5, e7). | |
| identifies(e4, e5). | (e4 identifies e5) |
| identifies(e10, e7). | |
| name(e11, e7). | |
| lp(e2, e5). | ("location of place"; e2 is-in e5) |

When customizing the system, the terms likely to be used by the users must be defined. The task of vocabulary definition includes connecting natural language terms to the entities in the schema and providing morphological information on them.

For the data base in our example, the following terms may be defined (the en's are entities in the schema, and the tn's denote the terms, where n is an integer):

EXAMPLE II

| | |
|---|---|
| (e1) ---> | 'capital' (t1) noun, plural: 'capitals', pronoun: 'it' |
| (e2) ---> | 'country' (t2) noun, plural: 'countries', prounoun: 'it' |
| (e7) ---> | 'continent' (t3) noun, plural: 'continents', pronoun: 'it' |
| (e8) ---> | 'product' (t4) noun, plural: 'products', pronoun: 'it' |
| (e6) ---> | 'export' (t5) verb, forms: 'exports', 'exported', 'exported', 'exporting' |
| (e6) ---> | 'produce' (t6) verb, forms: 'produces', 'produced', 'produced', 'producing' |

As can be seen the entity e6 has two different natural language terms connected to it, namely 'export' and 'produce' This signifies that in the object system of the data base, 'export' and 'produce' are synonyms.

The opposite situation could occur as well, e.g. the word 'export' could have the meaning of "the exported products" or it could mean the verb "to sell abroad". In this case clearly the same word relates to two different concepts (homonyms).

The customizer can define nouns, verbs and adjectives and connect them to the entities. Note that one entity may be connected to zero, one or several terms in natural language, and that the same term may be connected to more than one entity (concept).

The above definitions are stored as logical facts as a part of the conceptual schema (cf. EXAMPLE II):

EXAMPLE III image(e1, t1).
image(e2, t2).
image(e7, t3).
image(e8, t4).
image(e6, t5).
image(e6, t6).
category(t1, noun).

category(t2, noun).
category(t3, noun).
category(t4, noun).
category(t5, verb).
category(t6, verb).
term(t1 , 'capital')
term(t2, 'country')
term(t3, 'continent')
term(t4, 'product')
term(t5, 'export')
term(t6, 'produce')
syntax(t1 , 'capital'.'capitals'.'i'.nil).
syntax(t2, 'country'.'countries'.'i'.nil).
syntax(t3, 'continent'.'continents'.'i'.nil).
syntax(t4, 'product'.'products'.'i'.nil).
syntax(t5, 'export'.'exports'.'exported'. 'exported'.'exporting'.nil).
syntax(t6, 'produce'.'produces'.'produced'. 'produced'.'producing'.nil).

As can be seen, this collection of facts describes the link between the terms and the conceptual schema ("image( . . . )"), the grammatical class of terms ("category( . . . )"), the actual natural language word used for the term ("term( . . . )"), and the syntax ("syntax( . . . )") relevant to the term in the language in question (English in this case).

Thus, these expressions define how the terms (tn, where n is an integer) are related to the entities in the schema and what their grammatical classes are.

Dictionary entries are also created during the vocabulary definition. For example, the dictionary entry for the verb 'export' looks like this:

verb(verb(18380,feature(typ=na,lg=1),0),nil,verb-('export'))→'export

In order to relate natural language queries to the relational data base, it is necessary to link or connect concepts of the model (i.e. the schema itself) to the data base.

Not all concepts are related to the data base, but there can only be one data base link for a specific concept. Of course several different links may be introduced if necessary, through definition of new concepts.

The links or connections between entities (or concepts) in the schema to the data base is made via SQL expressions:

EXAMPLE IV (e2)→SELECT CNTRY FROM TABLE.CO
(el)→SELECT CPTL FROM TABLE.CO
(e3)→SELECT PRDCR FROM TABLE.EXPORT
(e8)→SELECT PRDCT FROM TABLE.EXPORT
(e11)→SELECT CNTNNT FROM TABLE.CNT (e4)→SELECT CNT ID FROM TABLE.CO
(e10)→SELECT ID FROM TABLE.CNT

The links to the data base can be very complicated SQL expressions. The information on such links is stored as the following logical facts and they too constitute a part of the conceptual schema together with the previously mentioned logical facts (see EXAMPLES II and III):

EXAMPLE V db(e2, set(V1 , relation(table.co(V1=cntry)))).
db(e1, set(V1 , relation(table.co(V1=cpt1)))).
db(e3, set(V1 , relation(table.export(V1=prdcr)))).
db(e8, set(V1, relation(table.export(V1=prdct)))).
db(e11, set(V1 , relation(table.cnt(V1=cntnnt)))).
db(e4, set(V1, relation(table.co(V1=cnt_id))))
db(e10, set(V1 , relation(table.cnt(V1=id)))).

Here "db" indicates the data base link, and "relation" shows the connection between an entity and the corresponding column of a table.

Thus, the conceptual schema consists of a collection of logical facts of the types according to EXAMPLES II, III, and V. Other types could also be conceived.

In the following, the translation of a natural language query into SQL will be described.

Parsing is the first step in processing a natural language query. The parser in the natural language analyzer 5 (FIG. 1) scans the input string character by character and finds, by using dictionary entries and grammar rules (syntactic rules) in the analysis grammar 8, all possible combinations of patterns which are grammatical. Parsing techniques are well known in the art and will not be discussed in detail. (See, for example, European Patent 91317 (Amano and Hirakawa)).

The parser produces, as one of its outputs, a single parse tree (or syntax tree), or several parse trees (FIG. 3A) if the query is ambiguous, describing how dictionary look-ups and application of syntactic rules resulted in recognition of an input string as being grammatical.

Figure 3A:
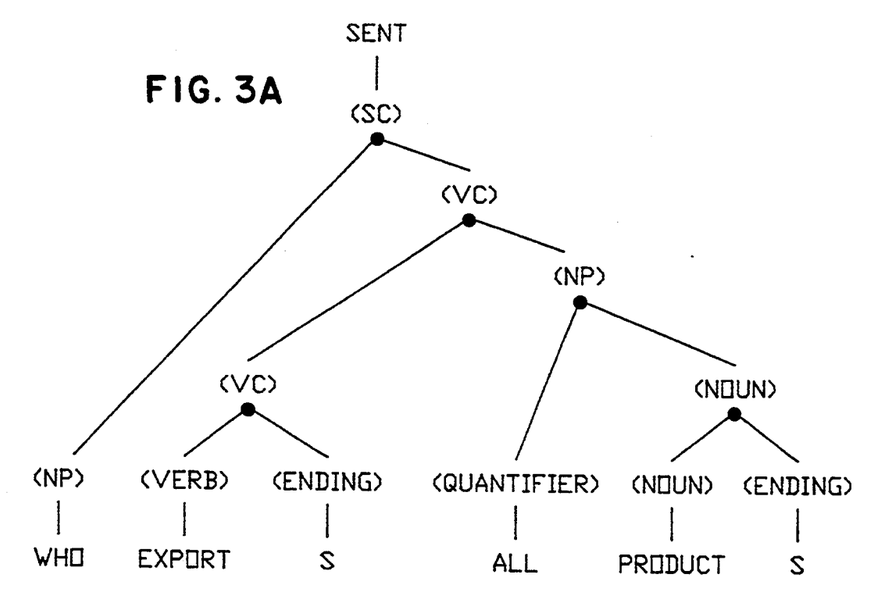
FIG. 3A is an example of a parse tree (or syntax tree) created during parsing.

For example the query 'who exports all products' will generate the parse tree shown in FIG. 3A. (Other examples of queries and the intermediate and final structures created in the parse process are given in the Appendix.)

As can be seen in FIG. 3A, the top of the tree reads (sent) indicating that the input string was identified as a proper sentence. All connections between branches and the ends of the branches are referred to as nodes, having identifiers such as (np), (vc) etc.

The meanings of these identifiers are mostly evident (e.g. verb, noun). However, (np) denotes a 'nominal phrase', (vc) means 'verbal construct' (equivalent to a 'verbal phrase'), and (sc) is a 'sentence construct' meaning a grammatically valid clause (not necessarily a complete sentence).

Further, every syntactic rule (grammar rule) is associated with zero, one or more semantic routines (executable programs), and the parser produces as a second output a semantic tree (FIG. 3B) in association with each syntax tree.

Two examples of grammar rules are given below:

```
<SENT:1:FPE-COMMAND(1,2)> <-<SC:TYP=AZ,+IMP,+CMD,(SYST=1)_
!(SYST=2)<>NP:+ACC>
<SCT:1,+ES,+CN:FPE-NOM(2,1)> <-<VC:TYP=NZ,+CNA,COL=COL(2)_
-DS,-PPE,-IMP,-PAS,((-SG)&(-SG(2)))!((-PL(2)))> <NP:+NOM_
-REL,-WPRO>;
```

These rules are built in one of the many formalisms that exist (in this case ULG), and thus constitute mere examples of how they can be built.

An argument of the syntactic rules may contain a call for or pointer to a semantic routine mentioned above, if appropriate, and for each rule that is activated and contains such "pointer" or "call", a semantic routine is allocated, and a "semantic tree" is built. (In the first of the given examples, the argument FPE-COMMAND(1,2) is a call for a routine named COMMAND thus building a node named COMMAND; in the second example, the argument is a call for NOM.)

The semantic trees are nested structures containing the semantic routines, and the trees form executable programs, which produce an intermediate representation form of the query when they are executed.

This intermediate representation form of the original query preserves the meaning of the query, as far as the universe of discourse (or object system) is concerned.

Figure 3B:
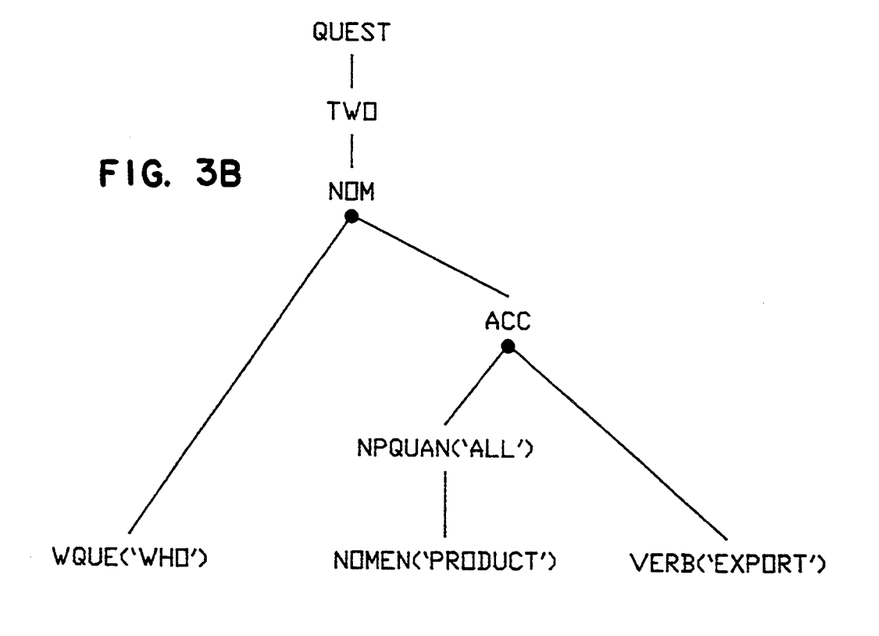
FIG. 3B is a graphic illustration of a semantic tree built by the parser.

The semantic tree of FIG. 3B has the following form when expressed as an executable program:

EXAMPLE VI

```
quest(p01,
  two(p02,
    nom(p03,
      wque(p04, 'who'),
      acc(p05,
        npquan(p06, 'all'
          nomen(p07, 'product')),
        verb(p08, 'export')))))).
```

Here the p's are pointers to the internal structures created during parsing for the input query, and each line begins with the name of the routine called for in the applied syntactic rule.

After completion of the semantic tree the main program enters next loop in which the tree is "decomposed" into its nodes (each individual semantic routine is a node), and the routines are executed from the bottom and up, which will trigger execution of the nested routines in the structure.

The semantic routines "use" the conceptual schema, and the information on the entities in the schema, for checking that the information contents of the generated semantic tree corresponds to a valid relationship structure within the universe of discourse defined by the schema. Thus, the execution of these routines performs a check of a language expression against the conceptual schema to see if the expression is a valid one (within the defined universe of discourse or object system).

By using the conceptual schema, the semantic routines generate a representation of the natural language queries in a form called CLF (conceptual logical form). This is a first order predicate logic with set and aggregate functions. (One of ordinary skill in the art can design such representations in many different ways and still achieve the same object.)

The CLF representation of the example query will then be:

EXAMPLE VII

```
query(
  report,
  set(y1,
    all(y2,
      instance(e8, y2) −>
      exist(y3,
        instance(e6, y3) &
        acc(y3,y2) &
        nom(y3,y1)))))).
``` simply meaning that the user wants a report (as opposed to a yes/no answer or a chart) of everything which exports all products and by 'all products' the user can here only mean products appearing as data in the database.

The CLF is then verified, completed, and disambiguated by checking against the conceptual schema. If, for example, the verb 'export' is defined in the conceptual schema such that it may take subjects from two different entities, then two CLF's must be produced, one for each case. On the other hand if there is no subject for the verb 'export' in the model, the CLF must be aborted.

In the above example, the checking against the model in the conceptual schema results in a more complete CLF as follows:

EXAMPLE VIII

```
query(
  report,
  set(y1,
    all(y2,
      instance(e8, y2) −>
      exist(y3,
        instance(e6, y3) &
        instance(e3, y1) &
        acc(y3,y2) &
        nom(y3,y1)))))).
``` where the added information is that the user wants a list of countries, 'country' (e2) being a supertype of the concept e3, 'producer'.

Contextual references are also resolved at this stage where any reference to previous queries, either in the form of a pronoun or fragment, is replaced by the appropriate CLF statements from those previous queries.

In order to verify the interpretation of the queries with the user and let the user select the correct interpretation among several alternatives generated by the invention, the CLF (conceptual logic form) must be presented in natural language form as paraphrasings of the original query.

To generate natural language from CLF, the CLF first is translated into a set of structures (trees) called Initial Trees. These trees contain such information as what the focus or core of the query is, what concepts are involved in the query, and what are the relationships between them. The following set of Initial Trees will be generated for our example CLF:

noun ((id=3).(group=1).(scope=nil).var=y1). (entity=e3).(focus=1).nil).

noun((id=1).(group=1).(scope=nil).(var=y2). (entity=e8).(all=1).nil).

verb((id=2).(group=1).(scope=y2.nil).(var=y3). (entity=e6).(acc=y2).(nom=y1),nil).

The paraphrased version of our previous example query will be 'List the countries that export all products'. This paraphrased expression is presented to the user for verification.

When the user has confirmed/selected the interpretation, the corresponding CLF is translated into an SQL-expression. This process involves two steps, namely a translation of the CLF to a further intermediate representation form (data base oriented logical form; herein referred to as DBLF).

This form is similar to the CLF (or any other equivalent representation that is used), except that the entities are replaced by their data base links from the conceptual schema (see Example IV). Thereby, the appropriate connections between the SQL tables are established.

In our example, the following DBLF is generated from the corresponding CLF (see Example VIII):

EXAMPLE IX

```
query(
  report,
  set(y1,
    relation(table.co(cntry=y1)) &
    all(y2,
      relation(table.export(prdct=y2)) — —>
      relation(table.export(prdcr=y2,cntry=y1)))))
```

The DBLF contains all information necessary to construct the SQL query.

There is also an optimization of the queries by removing redundant connections based on the information on the data base elicited during the customization.

If the natural language query cannot be translated into one single SQL query, the DBLF will be translated into something beyond pure SQL, and this extension of SQL is called an Answer Set. An Answer Set has the following components:

1) Temporary tables. A query like "How many countries are there in each continent" cannot be represented directly in SQL. To obtain the answer, a temporary table must be created, filled with data and then selected.
The information to do this is part of the Answer Set.
2) Range. There is no range concept in SQL. A query like "List the three highest mountains in the world" cannot be represented. The range specification in the Answer Set takes care of this and it is up to the program displaying the answer to the user to apply it.
3) Report. The third part of the Answer Set is related to how the answer should be presented to the user. There may be three options: Report (default), Chart, or YES/NO.

This makes it possible to handle queries like "Show me, in a bar chart, the sales figures for last month".

For the above example query, the following structures will be created:

EXAMPLE X

```
CREATE TABLE t1 (cntry , card)
INSERT INTO t1 (cntry , card)
  SELECT x1.cntry, COUNT( DISTINCT x1.prdct )
  FROM table.export x1 GROUP BY x1.cntry
SELECT DISTINCT x1.cntry
  FROM table.co x1,t1 x3
  WHERE x1.cntry = x3.cntry
  AND x3.card = (
  SELECT COUNT( DISTINCT x2.prdct )
  FROM table.export x2)
NIL
REPORT
``` which results in a temporary relation created as the SQL table T1 with the columns CNTRY and CARD. The column CNTRY is copied from the column CNTRY in the table TABLE.EXPORT and the values in the column CARD will be calculated as the number of distinct products (PRDCT column in TABLE,EXPORT) related to each country.

The final query is made against the T1 table and will result in a list of countries which export as many products as the number of distinct products found in the data base only France in this case.

Each query the user makes is automatically stored in a log. If the query is successful it is put in a Current Log, and if it fails it is put in an Error Log.

A query in the Current Log may be copied into the input field of the main program. There the user can edit it before it is processed. The Answer Set stored with the query can directly be used to obtain the answer.

The log can be stored and later reused by loading it into a Current Log. It can be viewed in a separate window. Queries appearing in such windows may be copied into the input line and the Answer Set sent to obtain the answer.

There is also provided a facility for creating the conceptual model and the vocabulary definition. This facility is referred to as a Customization Tool.

It is designed to be easy to use by providing a graphic interface (see FIG. 4), including an editing function, to the person performing the customization (the customizer).

With this interface the following functions are available:
- entities and relationships are presented as symbols (icons)
- the entities and relationships can be manipulated
- the current state of the model under construction is shown by highlighting the objects on the screen in different ways
- sets of objects can be clustered, for hiding complex structures in order to make the model more transparent The various entity icons 13 used in the graphic interface (see FIG. 4) can be, e.g. circles, ellipses, hexagons or triangles, whereby the shape is determined by the lexical category of terms referring to the entity in question. Each entity icon is annotated by the entity name.

Figure 4:
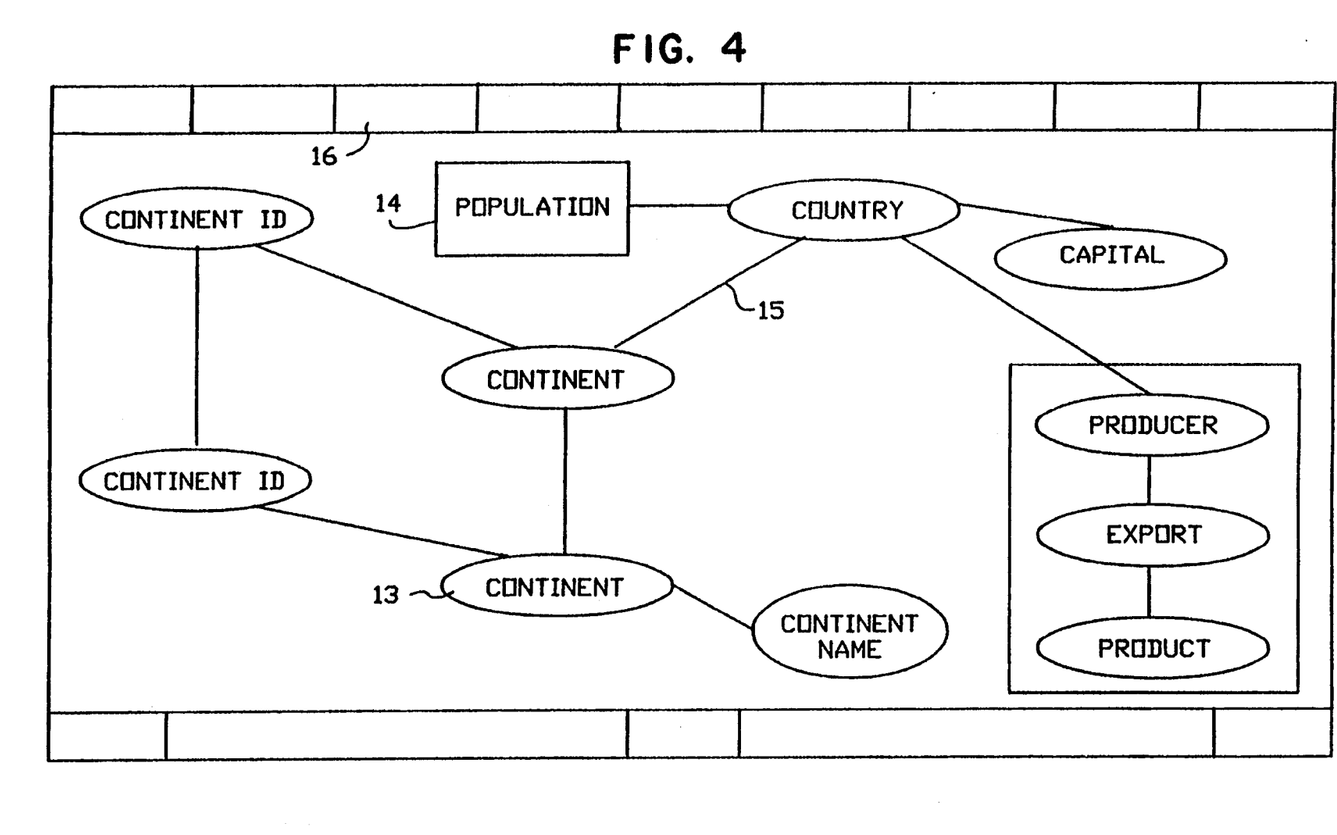
FIG. 4 is an illustration of the screen of the graphic interface of the Customizing Tool.

Relations or sets of relations between entities are represented by line segments (connector icons).

A cluster icon represents a subset of the schema, and has the shape of a rectangle 14.

A small diamond shaped icon (marker icon) is used to represent the current position in the schema.

The graphic interface uses the select-then-act protocol to manipulate entities and relationships. Below is given a brief description of the graphic interface.

Preferably a mouse is used for ease of use, and a number of options are selectable from various panels and action bars 16. For example 'Create Entity' displays an entity icon in a selected vacant spot on the screen. It also 'opens' the entity for inputting definitions of the entity.

The 'Create Connector' option is operable to create the relationship between two entities. With this option a line segment 15 connecting two previously defined entities is created.

If there are many entities connected to one single 'main' entity, a Cluster can be formed whereby only the selected 'main' entity is displayed, but with a different shape (e.g. a rectangle) to distinguish it from ordinary entity representations.

In a preferred embodiment implemented for a relational data base, the method comprises an initial step of identifying the tables in the data base and defining the relations between the tables. The system then automatically responds by suggesting a conceptual model comprising entities and relationships between these entities. This model is presented to the user (the customizer) for verification.

Thereafter, the customizer continues to interactively create entities and relationships in view of his/her knowledge of the system in question (e.g. a relational data base).

The method also comprises linking the entities to natural language terms, and storing the terms in a dictionary.

The entities are classified as belonging to any of a predefined set of types (person, place, event, process, time, identifier, name etc.), the types being stored.

In addition it comprises creating the links to the data base by identifying which data base representation (e.g. in a subset of SQL; see EXAMPLE IV) the entities shall have.

The whole model including entities, relationships, vocabulary and data base links is stored as (logical) facts.

A still further aspect of the invention is that by keeping knowledge of the system in question and other information used in the natural language analyzing apparatus in data base tables (such as SQL tables), users can use the method and apparatus of the invention to query that knowledge and thus request meta-knowledge.

In this way there is no difference between ordinary queries and meta-knowledge queries, neither from the user's point of view nor from the system's.

The conceptual schema for meta-knowledge is created in advance as a part of a base conceptual schema. Such a schema is application independent, and the tables used for storing said schema are called with unique dummy names when customized. During CLF to DBLF translation (as previously described) when these dummy table names appear in the data base representations, they are replaced with the correct table name corresponding to the current application.

For example, the table where a list of all tables included in the application is kept can be called 'appl tabs' when the schema for meta-knowledge is created. Then, when a specific application 'xyz' is run, the CLF to DBLF translator replaces 'appl tabs' with 'xyz tabs' in the data base representations.

As mentioned previously the conceptual model (schema) is stored as (logical) facts. There are identifiers associated with these facts corresponding to the name of a relational data base table (cf EXAMPLE III where the identifiers are the 'prefixes': 'image', 'category', 'term', etc).

In the process of creating meta-knowledge, when the person doing the customization ends a session, either having completed a model or terminating the modelling temporarily, these facts are automatically read from storage, the identifiers are recognized by the system, and the facts are stored in the empty, predefined tables (linked to the pre-created base conceptual schema). Note that the identifiers are not necessarily identical to the names of the tables; there may be conditions specifying that, e.g. the facts belonging to the identifier 'term' be put in a table labeled 'words'.

The tables that subsequently are 'filled' with facts are then accessible for querying in the same way as ordinary data base tables, thus providing the desired meta-knowledge.

APPENDIX

In this appendix a few more examples of queries and the intermediate representations of the queries, and the final SQL is listed (note that the entire Answer Set is not given).

EXAMPLE 1

'List the capitals of the countries'
Semantic tree:
  command(
    p85,
    gener(
      p37,
      'liste')'
    npdef(
      p75,
      'die',
      attgen(
        p64,
        nomen(
          p62,
          'capital'),
        prep(
          p61,
          npdef(
            p58,
            'die',
            nomen(
              p53,
              'country')),
          'pp',
          gener(
            p47,
            'of')))))
CLF:
  query(report,0,
    set(y1,
      instance(capital,y1) &
      exist(y2,
        instance(country,y2) &
        possesses(y2,y1))))
DBLF:
query(report,0 set(y2,
  relation((table.co(capital = y1, country = y2))))))
SQL:
SELECT DISTINCT x1.capital,x1.country FROM table.co x1

EXAMPLE 2

'what does England export'
CLF:
query(report,0 set(y1,
  instance(product,y1) &  exist(y2,
    instance(provider,y2) &
    name(y2,'great britain') &
    exist(y3,
      instance(export,y3) &
      nom(y3,y2) &
      acc(y3,y1)))))
DBLF:
query(report,0 set(y1,
  relation(table.exportbase(country = 'great_
      britain',product = y1))))
SQL:
SELECT DISTINCT x1.product
  FROM table.exportbase x1
  WHERE x1.country = 'great britain'

EXAMPLE 3

'What are the populations of the ec-countries'
CLF:
query(report,0 set(y2,
  instance(population,y2) &
  exist(y3,
    instance(ec-country,y3) &
    possesses(y3,y2))))
DBLF:
query(report,0 set(y2,
  set(y3,
    relation(table.co(population = y2)) &

-continued

```
        relation(table.orgbase(countxy = y3,_
              organization = 'EC')))))
SQL:
    SELECT DISTINCT x1.population,x2.country
    FROM table.co x1,table.orgbase x2
    WHERE x2.organization = 'EC'
    AND x2.country = x1.country
```

We claim:

1. A natural language analyzing apparatus comprising:
    a data base store comprising a data base containing tables;
    a grammar store comprising a grammar for a natural language comprising a set of language dependent syntax rules for the natural language, at least one syntax rule having one or more associated semantic routines;
    a vocabulary store comprising a vocabulary containing terms of the natural language, definitions of the terms, and morphological information about the terms;
    a conceptual model store comprising a conceptual model having (i) a set of language independent records of information defining entities, each entity having a connection to at least one term in the vocabulary, at least one entity having a connection to the data base tables, and each term in the vocabulary being defined by at least one entity, and (ii) a set of records identifying relationships between different entities;
    means for inputting a series of words based in the natural language;
    parsing means for generating one or more syntactically valid parse trees for the input series of words based on the vocabulary and the syntax rules, and for building, for each parse tree, an executable set of semantic routines based on one or more semantic routines associated with one or more of the syntax rules used to generate the parse tree;
    generator means for executing the set of semantic routines generated by the parser to create a language independent representation of the input series of words, wherein executing the semantic routine comprises checking groups of one or more words in the parse trees against the conceptual model for conceptual validity;
    output means for producing, from said language independent representation of the input series of words, a natural language output series of words in the same language as the input series of words, said output series of words representing a paraphrase of the input series of words;
    confirmation means for requesting confirmation of the conceptual accuracy of the output series of words with reject to the input series of words and for receiving a confirmation from the user if the user determines that the output series of words conceptually matches the input series of words; and
    query generator means responsive to the confirmation for producing a data base query from the language independent representation.

2. An apparatus as claimed in claim 1, wherein the data base is a relational data base.

3. The apparatus as claimed in claim 2, further comprising means responsive to the query generating means for producing a response to the data base query.

4. An apparatus as claimed in claim 3, comprising means for storing a previous query, and means for storing for the previous query a corresponding answer set, said answer set comprising a query statement, a specification of how much of the data in the data base tables is to be presented to a user of the apparatus, and information on a mode of presentation of the data.

5. A method of querying an information store comprising the steps of:
    generating a computer-readable input representing an input series of words in a natural language;
    parsing an input expression to generate one or more syntactically valid parse trees for the input series of words based on a vocabulary containing terms of the natural language, definitions of the terms, and morphological information about the terms, and based on syntax rules of a grammar for the natural language, at least one syntax rule having one or more associated semantic routines;
    building, for each parse tree, an executable set of semantic routines based on the one or more semantic routines associates with the at least one syntax rules having one or more associated semantic routines and used to generate the parse tree;
    executing the executable set of semantic routines to create a language independent representation of the input series of words based on a conceptual model having (i) a set of language independent records of information defining entities, each entity having a connection to at least one term in the vocabulary, at least one entity having a connection to a data base table, and each term in the vocabulary being defined by at least one entity, and (ii) a set of records identifying relationships between different entities, wherein executing the semantic routine comprises checking groups of one or more words in the parse trees against the conceptual model for conceptual validity;
    producing, from said language independent representation of the input series of words, a natural language output series of words in the same language as the input series of words, said output series of words representing a paraphrase of the input series of words;
    requesting confirmation of the conceptual accuracy of the output series of words with respect to the input series of words, and producing a confirmation if the output series of words is conceptually correct; and
    if the confirmation is produced, producing, in response to the confirmation, a data base query from the language independent representation.

6. The method as claimed in claim 5, further comprising querying a data base with the data base query.

7. A method as claimed in claim 6, wherein if an answer cannot directly be retrieved from the data base tables in one single query statement, temporary tables are created and filed with data, said temporary tables being queried for a final answer.

8. A method as claimed in claim 7, wherein the data is ordered by ascending or descending value; of the data.

9. A method as claimed in claim 8, wherein only a selected portion of the data is presented to a user of the method.

10. A method as claimed in claim 9, wherein an answer set comprising an instruction to create and fill the temporary tables, together with the query and a range of data to be selected from the temporary tables, is stored in a log for later use.

11. A method as claimed in claim 10, wherein the stored answer set is copied into an input field of a query panel of a query program.

* * * * *